(12) United States Patent
Takahashi et al.

(10) Patent No.: US 11,143,182 B2
(45) Date of Patent: Oct. 12, 2021

(54) FIXATION DETECTING APPARATUS TO PREVENT AUDIBLE SOUND FROM EMANATING FROM OIL PUMP DURING OIL PUMP OPERATION STATE DETERMINATION

(71) Applicant: SUBARU CORPORATION, Tokyo (JP)

(72) Inventors: Yoshitaka Takahashi, Tokyo (JP); Susumu Yamagata, Tokyo (JP); Sho Yoshida, Tokyo (JP); Katsuyuki Namiki, Tokyo (JP); Kyohei Sugiyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 238 days.

(21) Appl. No.: 16/209,757

(22) Filed: Dec. 4, 2018

(65) Prior Publication Data

US 2019/0301457 A1    Oct. 3, 2019

(30) Foreign Application Priority Data

Mar. 29, 2018    (JP) .............................. JP2018-063689

(51) Int. Cl.
*F04C 15/06*    (2006.01)
*F16H 61/12*    (2010.01)
(Continued)

(52) U.S. Cl.
CPC ............. *F04C 15/06* (2013.01); *F16H 61/12* (2013.01); *F04C 14/24* (2013.01); *F04C 14/28* (2013.01);
(Continued)

(58) Field of Classification Search
CPC .......... F04C 15/06; F04C 14/24; F04C 14/28; F04C 2270/80; F04C 2210/206;
(Continued)

(56) References Cited

U.S. PATENT DOCUMENTS 10,400,889 B2 *  9/2019  Igarashi .................. F15B 11/08
10,443,716 B2 * 10/2019  Igarashi .............. F16H 61/0025
(Continued)

FOREIGN PATENT DOCUMENTS

JP    2016183579 A   * 10/2016
JP    2017-031938 A     2/2017
(Continued)

OTHER PUBLICATIONS

English Abstractor JP2016183579A (Year: 2016).*
Japanese Office Action, dated Oct. 1, 2019, in Japanese Application No. 2018-063689 and English Translation thereof.

*Primary Examiner* — Essama Omgba
*Assistant Examiner* — Paul W Thiede
(74) *Attorney, Agent, or Firm* — McGinn, I.P. Law Group, PLLC.

(57) ABSTRACT

An oil pump fixation detecting apparatus includes an oil pump, a discharge state switching unit, a target oil pressure setting unit, a pressure regulator, and a fixation determining unit. The discharge state switching unit performs control of switching a discharge state of the oil pump from a full-discharge state to a partial-discharge state. The fixation determining unit determines that the oil pump is not fixed in the full-discharge state in a case where oil pressure in a high-pressure oil passage has dropped by a predetermined value or more within a predetermined time, and determines that the oil pump is fixed in the full-discharge state in a case where the oil pressure in the high-pressure oil passage does not drop by the predetermined value or more.

12 Claims, 5 Drawing Sheets

(51) Int. Cl.
*F04C 14/28* (2006.01)
*F04C 14/24* (2006.01)
(52) U.S. Cl.
CPC .... *F04C 2210/206* (2013.01); *F04C 2270/80* (2013.01)
(58) Field of Classification Search
CPC ............. F16H 61/12; F16H 2061/1228; F16H 2061/1264; F16H 61/662; F16H 2061/1208; F15B 1/04; F15B 11/08; F15B 13/0416; F15B 15/20; F15B 2211/50; F15B 20/004
See application file for complete search history.

(56) References Cited

U.S. PATENT DOCUMENTS

| | | |
|---|---|---|
| 2017/0167603 A1 | 6/2017 | Igarashi et al. |
| 2017/0248225 A1 | 8/2017 | Igarashi et al. |

FOREIGN PATENT DOCUMENTS

| | | |
|---|---|---|
| JP | 2017-101765 A | 6/2017 |
| JP | 2017-106581 A | 6/2017 |
| JP | 2017-150603 A | 8/2017 |

* cited by examiner

FIXATION DETECTING APPARATUS TO PREVENT AUDIBLE SOUND FROM EMANATING FROM OIL PUMP DURING OIL PUMP OPERATION STATE DETERMINATION

CROSS-REFERENCE TO RELATED APPLICATIONS

The present application claims priority from Japanese Patent Application No. 2018-063689 filed on Mar. 29, 2018, the entire contents of which are hereby incorporated by reference.

BACKGROUND

The technology relates to an oil pump fixation detecting apparatus and an oil pump fixation detecting method that each determine whether an oil pump that is switchable between a full-discharge state and a partial-discharge state is fixed in one of the full-discharge state and the partial-discharge state.

An automatic transmission for a vehicle, such as a stepped automatic transmission (Step AT) or a continuously variable transmission (CVT), includes an oil pump that is actuated by a motive power of an engine and discharges high-pressure oil. Such an automatic transmission regulates the pressure of the high-pressure oil discharged from the oil pump and supplies the pressure-regulated oil to implement each operation, such as gear shifting or forward/reverse switching.

In recent years, the demand for improving fuel economy of vehicles has necessitated a reduction in a load, i.e., a loss, in an oil pump. As an oil pump that allows for such reduction in the load, for example, an oil pump that switches its discharge state, i.e., its discharge flow rate, with the use of a switching solenoid has been put into practical use. For example, an oil pump, or a variable capacity pump, that is enabled to switch between a full-discharge state, i.e., a full-capacity driving state, and a half-discharge state, i.e., a half-capacity driving state, has been put into practical use. In the full-discharge state, two discharge ports are totally cut off from an intake port. In the half-discharge state, one of the two discharge ports communicates with the intake port.

If such an oil pump is fixed in the full-discharge state, it becomes difficult to reduce the load, i.e., to improve the fuel economy. Meanwhile, when such an oil pump is fixed in the half-discharge state, it may become difficult to feed the oil at a flow rate required for an automatic transmission, for example. In this respect, Japanese Unexamined Patent Application Publication (JP-A) No. 2017-106581 discloses an abnormality detection device for a hydraulic circuit. This abnormality detection device detects fixation of a switching unit that switches a discharge state of an oil pump between a full-discharge state and a half-discharge state.

To be more specific, this abnormality detection device includes a switching control unit, a pressure regulation control unit, and a determination unit. The switching control unit performs switching control of making a switch to the half-discharge state. The pressure regulation control unit performs pressure regulation control of achieving a target line pressure that is higher than a maximum discharge pressure in the half-discharge state. The determination unit determines that a switching solenoid valve and/or a switching valve are/is experiencing fixation abnormality in the full-discharge state in a case where a line pressure detected by a line pressure detecting sensor is higher than the maximum discharge pressure in the half-discharge state. In other words, in this abnormality detection device, a diagnostic target oil pressure is raised to a value at which oil is no longer discharged in the half-discharge state, and the determination of abnormality is made in a case where an actual pressure has risen to the stated diagnostic target oil pressure. In other words, it is determined that the oil pump is fixed in the full-discharged state in a case where the actual pressure has risen to a value that is impossible to achieve in the half-discharge state. In other cases, the oil pump is determined to be normal.

SUMMARY

An aspect of the technology provides an oil pump fixation detecting apparatus that includes an oil pump, a discharge state switching unit, a target oil pressure setting unit, a pressure regulator, and a fixation determining unit. The oil pump is configured to raise a pressure of oil sucked in through an intake port and discharge the oil through a plurality of discharge ports. The discharge state switching unit is configured to switch a discharge state of the oil pump between a full-discharge state and a partial-discharge state. All ports of the plurality of discharge ports communicate with a high-pressure oil passage in the full-discharge state. One or more ports of the plurality of discharge ports communicate with the high-pressure oil passage and another one or more ports of the plurality of discharge ports communicate with the intake port of the oil pump in the partial-discharge state. The target oil pressure setting unit is configured to set a diagnostic target oil pressure directed to determining whether the oil pump is fixed in one of the full-discharge state and the partial-discharge state. The pressure regulator is configured to regulate an oil pressure in the high-pressure oil passage to allow the oil pressure in the high-pressure oil passage to coincide with the diagnostic target oil pressure. The fixation determining unit is configured to carry out a fixation determination as to whether the oil pump is fixed in one of the full-discharge state and the partial-discharge state on the basis of the oil pressure regulated by the pressure regulator. As full-discharge switching, the discharge state switching unit controls the discharge state of the oil pump to be the full-discharge state, when the fixation determining unit carries out the fixation determination. As target oil pressure setting, the target oil pressure setting unit sets, as the diagnostic target oil pressure, a value higher than a maximum pressure in the partial-discharge state, when the fixation determining unit carries out the fixation determination. As oil pressure regulation, the pressure regulator regulates the oil pressure in the high-pressure oil passage to allow the oil pressure in the high-pressure oil passage to coincide with the diagnostic target oil pressure, when the fixation determining unit carries out the fixation determination. The discharge state switching unit performs control of switching the discharge state of the oil pump from the full-discharge state to the partial-discharge state, after the full-discharge switching, the target oil pressure setting, and the oil pressure regulation have been performed. The fixation determining unit determines that the oil pump is not fixed in the full-discharge state in a case where the oil pressure in the high-pressure oil passage has dropped by a predetermined value or more within a predetermined time after the control of switching the discharge state of the oil pump from the full-discharge state to the partial-discharge state has been performed. The fixation determining unit determines that the oil pump is fixed in the full-discharge state in a case where the oil pressure in the high-pressure oil passage does not drop by the predetermined value or more within the predetermined time after the control of switching the discharge state of the oil pump from the full-discharge state to the partial-discharge state has been performed.

An aspect of the technology provides an oil pump fixation detecting apparatus that includes an oil pump, a discharge state switching unit, a target oil pressure setting unit, a pressure regulator, and a fixation determining unit. The oil pump is configured to raise a pressure of oil sucked in through an intake port and discharge the oil through a plurality of discharge ports. The discharge state switching unit is configured to switch a discharge state of the oil pump between a full-discharge state and a partial-discharge state. All ports of the plurality of discharge ports communicate with a high-pressure oil passage in the full-discharge state. One or more ports of the plurality of discharge ports communicate with the high-pressure oil passage and another one or more ports of the plurality of discharge ports communicate with the intake port of the oil pump in the partial-discharge state. The target oil pressure setting unit is configured to set a diagnostic target oil pressure directed to determining whether the oil pump is fixed in one of the full-discharge state and the partial-discharge state. The pressure regulator is configured to regulate an oil pressure in the high-pressure oil passage to allow the oil pressure in the high-pressure oil passage to coincide with the diagnostic target oil pressure. The fixation determining unit is configured to carry out a fixation determination as to whether the oil pump is fixed in one of the full-discharge state and the partial-discharge state on the basis of the oil pressure regulated by the pressure regulator. As full-discharge switching, the discharge state switching unit controls the discharge state of the oil pump to be the full-discharge state, when the fixation determining unit carries out the fixation determination. As target oil pressure setting, the target oil pressure setting unit sets, as the diagnostic target oil pressure, a value higher than a maximum pressure in the partial-discharge state, when the fixation determining unit carries out the fixation determination. As oil pressure regulation, the pressure regulator regulates the oil pressure in the high-pressure oil passage to allow the oil pressure in the high-pressure oil passage to coincide with the diagnostic target oil pressure, when the fixation determining unit carries out the fixation determination. The discharge state switching unit performs control of switching the discharge state of the oil pump from the full-discharge state to the partial-discharge state, after the full-discharge switching, the target oil pressure setting, and the oil pressure regulation have been performed. The fixation determining unit determines that the oil pump is not fixed in the full-discharge state in a case where the oil pressure in the high-pressure oil passage has dropped to or below the maximum pressure in the partial-discharge state after the control of switching the discharge state of the oil pump from the full-discharge state to the partial-discharge state has been performed. The fixation determining unit determines that the oil pump is fixed in the full-discharge state in a case where the oil pressure in the high-pressure oil passage does not drop to or below the maximum pressure in the partial-discharge state after the control of switching the discharge state of the oil pump from the full-discharge state to the partial-discharge state has been performed.

An aspect of the technology provides an oil pump fixation detecting method of determining whether an oil pump configured to raise a pressure of oil sucked in through an intake port and discharge the oil through a plurality of discharge ports is fixed in one of a full-discharge state and a partial-discharge state, all ports of the plurality of discharge ports communicating with a high-pressure oil passage in the full-discharge state, one or more ports of the plurality of discharge ports communicating with the high-pressure oil passage and another one or more ports of the plurality of discharge ports communicating with the intake port of the oil pump in the partial-discharge state, the oil pump fixation detecting method includes: as full-discharge switching, controlling a discharge state of the oil pump to be the full-discharge state; as target oil pressure setting, setting, as a diagnostic target oil pressure, a value higher than a maximum pressure in the partial-discharge state, the diagnostic target oil pressure directed to determining whether the oil pump is fixed in one of the full-discharge state and the partial-discharge state; as oil pressure regulation, regulating an oil pressure in the high-pressure oil passage to allow the oil pressure in the high-pressure oil passage to coincide with the diagnostic target oil pressure; as partial-discharge switching, performing control of switching the discharge state of the oil pump from the full-discharge state to the partial-discharge state, after the full-discharge switching, the target oil pressure setting, and the oil pressure regulation have been performed; and as full-discharge fixation determination, determining that the oil pump is not fixed in the full-discharge state in a case where the oil pressure in the high-pressure oil passage has dropped by a predetermined value or more within a predetermined time after the control of switching the discharge state of the oil pump from the full-discharge state to the partial-discharge state has been performed, and determining that the oil pump is fixed in the full-discharge state in a case where the oil pressure in the high-pressure oil passage does not drop by the predetermined value or more within the predetermined time after the control of switching the discharge state of the oil pump from the full-discharge state to the partial-discharge state has been performed.

An aspect of the technology provides an oil pump fixation detecting method of determining whether an oil pump configured to raise a pressure of oil sucked in through an intake port and discharge the oil through a plurality of discharge ports is fixed in one of a full-discharge state and a partial-discharge state, all ports of the plurality of discharge ports communicating with a high-pressure oil passage in the full-discharge state, one or more ports of the plurality of discharge ports communicating with the high-pressure oil passage and another one or more ports of the plurality of discharge ports communicating with the intake port of the oil pump in the partial-discharge state, the oil pump fixation detecting method includes: as full-discharge switching, controlling a discharge state of the oil pump to be the full-discharge state; as target oil pressure setting, setting, as a diagnostic target oil pressure, a value higher than a maximum pressure in the partial-discharge state, the diagnostic target oil pressure directed to determining whether the oil pump is fixed in one of the full-discharge state and the partial-discharge state; as oil pressure regulation, regulating an oil pressure in the high-pressure oil passage to allow the oil pressure in the high-pressure oil passage to coincide with the diagnostic target oil pressure; as partial-discharge switching performing control of switching the discharge state of the oil pump from the full-discharge state to the partial-discharge state, after the full-discharge switching, the target oil pressure setting, and the oil pressure regulation have been performed; and as full-discharge fixation determination, determining that the oil pump is not fixed in the full-discharge state in a case where the oil pressure in the high-pressure oil passage has dropped to or below the maximum pressure in the partial-discharge state after the control of switching the discharge state of the oil pump from the full-discharge state to the partial-discharge state has been performed, and determining that the oil pump is fixed in the full-discharge state in a case where the oil pressure in the high-pressure oil passage does not drop to or below the maximum pressure in the partial-discharge state after the control of switching the discharge state of the oil pump from the full-discharge state to the partial-discharge state has been performed.

An aspect of the technology provides an oil pump fixation detecting apparatus that includes an oil pump and circuitry. The oil pump is configured to raise a pressure of oil sucked in through an intake port and discharge the oil through a plurality of discharge ports. The circuitry is configured to switch a discharge state of the oil pump between a full-discharge state and a partial-discharge state. All ports of the plurality of discharge ports communicate with a high-pressure oil passage in the full-discharge state. One or more ports of the plurality of discharge ports communicate with the high-pressure oil passage and another one or more ports of the plurality of discharge ports communicate with the intake port of the oil pump in the partial-discharge state. The circuitry is configured to set a diagnostic target oil pressure directed to determining whether the oil pump is fixed in one of the full-discharge state and the partial-discharge state. The circuitry is configured to regulate an oil pressure in the high-pressure oil passage to allow the oil pressure in the high-pressure oil passage to coincide with the diagnostic target oil pressure. The circuitry is configured to carry out a fixation determination as to whether the oil pump is fixed in one of the full-discharge state and the partial-discharge state on the basis of the regulated oil pressure. As full-discharge switching, the circuitry controls the discharge state of the oil pump to be the full-discharge state, when the fixation determination is carried out. As target oil pressure setting, the circuitry sets, as the diagnostic target oil pressure, a value higher than a maximum pressure in the partial-discharge state, when the fixation determination is carried out. As oil pressure regulation, the circuitry regulates the oil pressure in the high-pressure oil passage to allow the oil pressure in the high-pressure oil passage to coincide with the diagnostic target oil pressure, when the fixation determination is carried out. The circuitry performs control of switching the discharge state of the oil pump from the full-discharge state to the partial-discharge state, after performing the full-discharge switching, the target oil pressure setting, and the oil pressure regulation. The circuitry determines that the oil pump is not fixed in the full-discharge state in a case where the oil pressure in the high-pressure oil passage has dropped by a predetermined value or more within a predetermined time after the control of switching the discharge state of the oil pump from the full-discharge state to the partial-discharge state has been performed. The circuitry determines that the oil pump is fixed in the full-discharge state in a case where the oil pressure in the high-pressure oil passage does not drop by the predetermined value or more within the predetermined time after the control of switching the discharge state of the oil pump from the full-discharge state to the partial-discharge state has been performed.

An aspect of the technology provides an oil pump fixation detecting apparatus that includes an oil pump and circuitry. The oil pump is configured to raise a pressure of oil sucked in through an intake port and discharge the oil through a plurality of discharge ports. The circuitry is configured to switch a discharge state of the oil pump between a full-discharge state and a partial-discharge state. All ports of the plurality of discharge ports communicate with a high-pressure oil passage in the full-discharge state. One or more ports of the plurality of discharge ports communicate with the high-pressure oil passage and another one or more ports of the plurality of discharge ports communicate with the intake port of the oil pump in the partial-discharge state. The circuitry is configured to set a diagnostic target oil pressure directed to determining whether the oil pump is fixed in one of the full-discharge state and the partial-discharge state. The circuitry is configured to regulate an oil pressure in the high-pressure oil passage to allow the oil pressure in the high-pressure oil passage to coincide with the diagnostic target oil pressure. The circuitry is configured to carry out a fixation determination as to whether the oil pump is fixed in one of the full-discharge state and the partial-discharge state on the basis of the oil pressure regulated by the pressure regulator. As full-discharge switching, the circuitry controls the discharge state of the oil pump to be the full-discharge state, when the fixation determination is carried out. As target oil pressure setting, the circuitry sets, as the diagnostic target oil pressure, a value higher than a maximum pressure in the partial-discharge state, when the fixation determination is carried out. As oil pressure regulation, the circuitry regulates the oil pressure in the high-pressure oil passage to allow the oil pressure in the high-pressure oil passage to coincide with the diagnostic target oil pressure, when the fixation determination is carried out. The circuitry performs control of switching the discharge state of the oil pump from the full-discharge state to the partial-discharge state, after the full-discharge switching, the target oil pressure setting, and the oil pressure regulation have been performed. The circuitry determines that the oil pump is not fixed in the full-discharge state in a case where the oil pressure in the high-pressure oil passage has dropped to or below the maximum pressure in the partial-discharge state after the control of switching the discharge state of the oil pump from the full-discharge state to the partial-discharge state has been performed. The circuitry determines that the oil pump is fixed in the full-discharge state in a case where the oil pressure in the high-pressure oil passage does not drop to or below the maximum pressure in the partial-discharge state after the control of switching the discharge state of the oil pump from the full-discharge state to the partial-discharge state has been performed.

DETAILED DESCRIPTION

Figure 1:
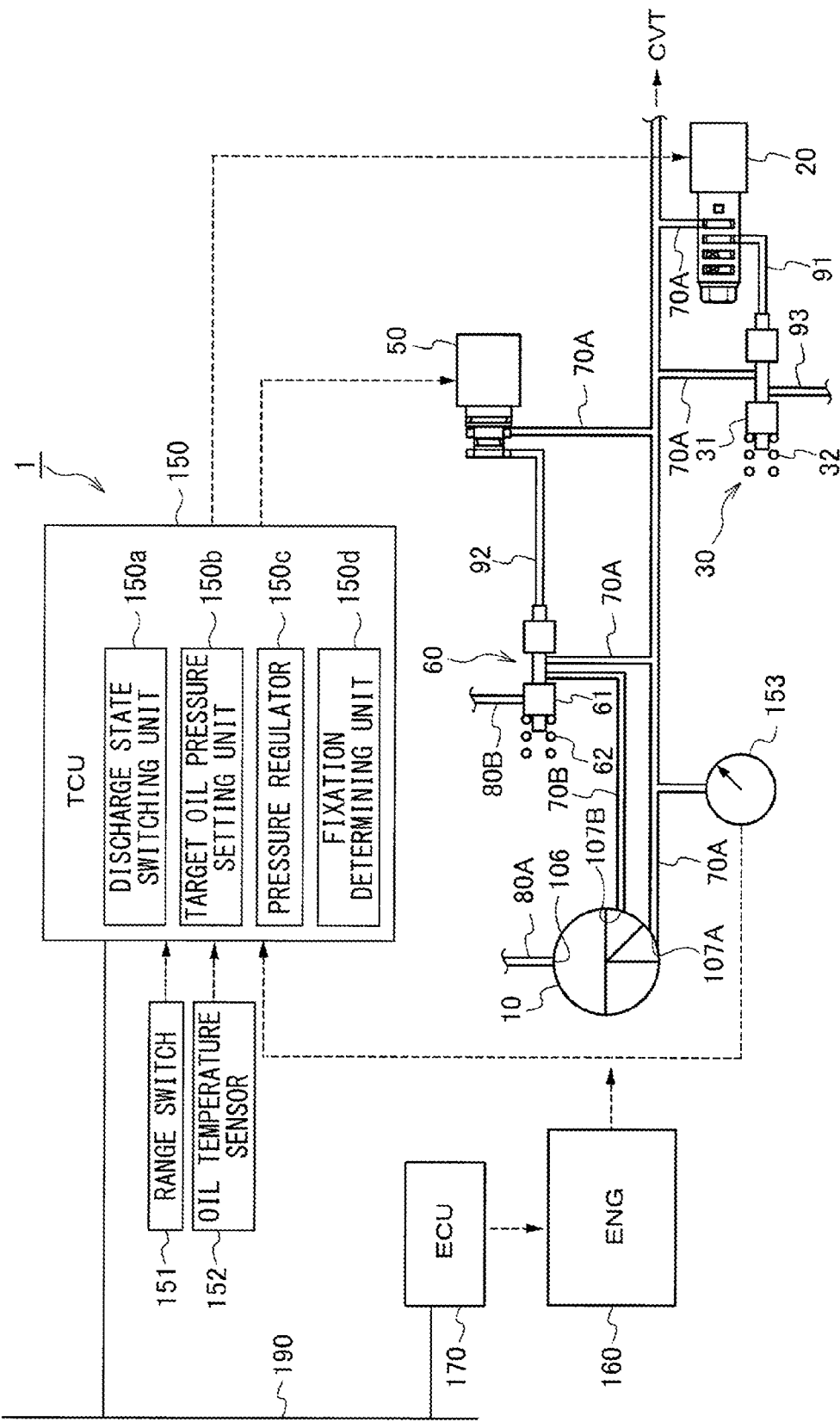
FIG. 1 is a diagram illustrating an example of a configuration of an oil pump fixation detecting apparatus according to one implementation.

In the following, some implementations of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example implementations which are not recited in a most-generic independent claim of the disclosure are optional and may be provided on an as-needed basis. Throughout the present specification and the drawings, elements having substantially the same function and configuration are denoted with the same numerals to avoid any redundant description.

According to the abnormality detection device disclosed in JP-A No. 2017-106581 described above, it is possible to detect fixation of an oil pump with high accuracy. With this abnormality detection device, however, while diagnosis of fixation of an oil pump is being made, a strange sound traceable to the oil pump may occur when the oil pump enters the half-discharge state, i.e., a partial-discharge state, and a high-pressure state. This may cause a sense of discomfort in an occupant such as a driver, for example.

It is desirable to provide an oil pump fixation detecting apparatus and an oil pump fixation detecting method that make it possible to detect fixation of an oil pump in a full-discharge state and a partial-discharge state without causing a sense of discomfort in an occupant such as a driver during fixation diagnosis.

The present inventors have conducted diligent studies on the above issue and found that the strange sound mentioned above may be a fluid sound produced when the discharge flow rate has increased in the half-discharge state, i.e., the partial-discharge state, and a sound caused by oil vibration that occurs when the pressure is raised in the half-discharge state. Further, it has been found that, in the fixation detecting apparatus described above, the oil pump may be put in the half-discharge state, i.e., the partial-discharge state, in each of a phase in which the oil pressure is raised and a phase in which a determination on fixation is made, which may tend to extend the duration in which the strange sound occurs.

Figure 2:
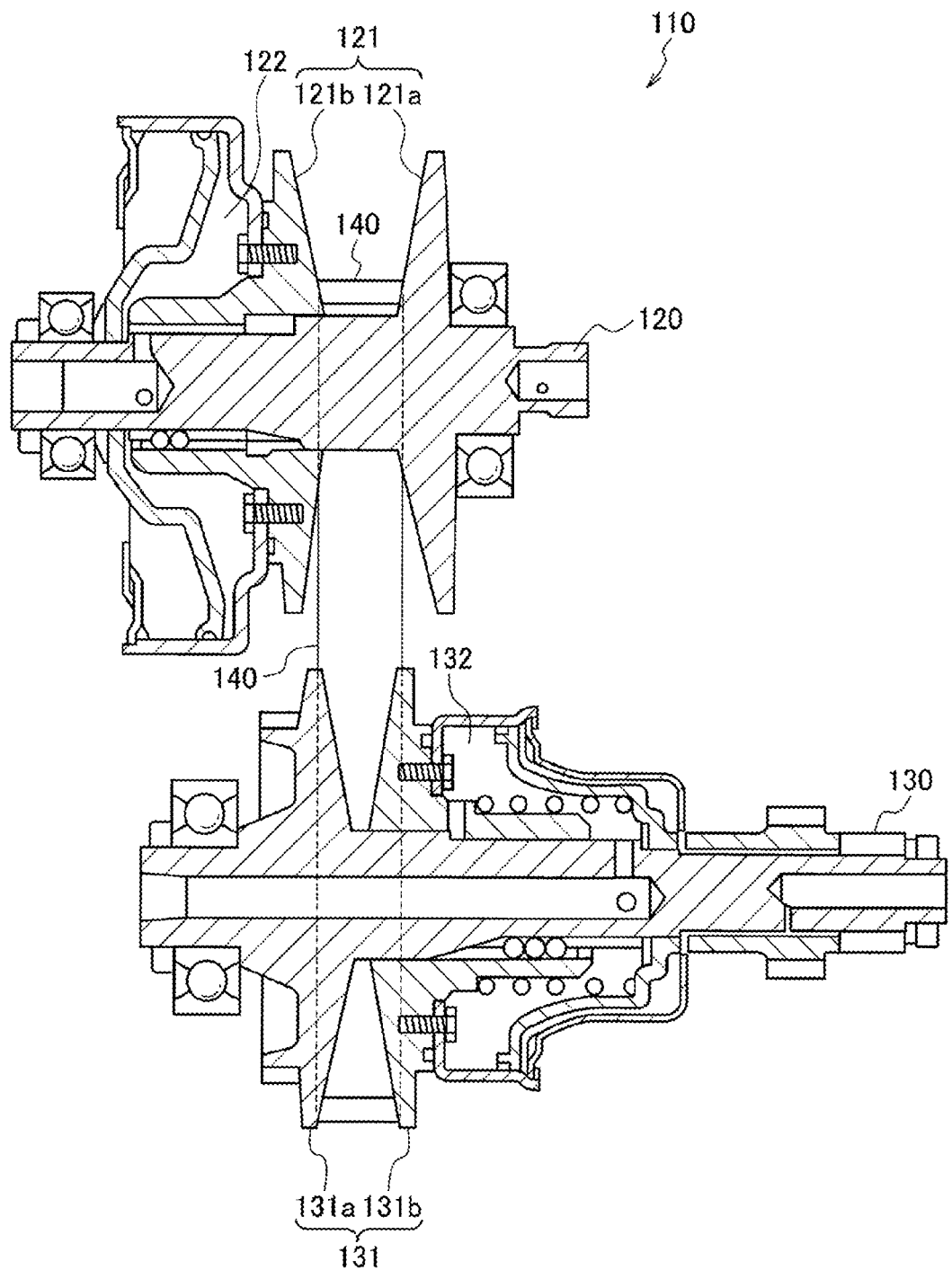
FIG. 2 is a diagram illustrating an example of a configuration of a continuously variable transmission to which the oil pump fixation detecting apparatus according to one implementation is applied.

Referring to FIGS. 1 and 2 together, an example of a configuration of an oil pump fixation detecting apparatus 1 according to one example implementation will be described. The oil pump fixation detecting apparatus 1 may detect fixation of an oil pump 10 in one of a full-discharge state and a half-discharge state. In one implementation, the half-discharge state may correspond to a "partial-discharge state". In this example, a case where one implementation of the technology is applied to a continuously variable transmission (CVT) 110 will be described. FIG. 1 illustrates an example of a configuration of the oil pump fixation detecting apparatus 1. FIG. 2 illustrates an example of a configuration of the continuously variable transmission 110 to which the oil pump fixation detecting apparatus 1 is applied.

The continuously variable transmission 110 may be coupled to a crankshaft of an engine 160 via an unillustrated torque converter, for example. The continuously variable transmission 110 may convert driving force from the engine 160 and output the converted driving force. The continuously variable transmission 110 may include a primary shaft, i.e., an input shaft, 120 and a secondary shaft, i.e., an output shaft, 130. The primary shaft 120 may be coupled to an output shaft of the torque converter. The secondary shaft 130 may be disposed parallel to the primary shaft 120.

The primary shaft 120 may be provided with a primary pulley 121. The primary pulley 121 may include a stationary pulley 121a and a movable pulley 121b. In other words, the movable pulley 121b may be a sheave. The stationary pulley 121a may be bonded to the primary shaft 120. The movable pulley 121b may oppose the stationary pulley 121a. The movable pulley 121b may be so mounted as to be slidable in an axial direction of the primary shaft 120 and nonrotatable relative to the axial direction of the primary shaft 120. A gap between cone surfaces of the respective stationary pulley 121a, and movable pulley 121b, i.e., a pulley groove width in the primary pulley 121, may be variable. Meanwhile, the secondary shaft 130 may be provided with a secondary pulley 131. The secondary pulley 131 may include a stationary pulley 131a and a movable pulley 131b. In other words, the movable pulley 131b may be a sheave. The stationary pulley 131a may be bonded to the secondary shaft 130. The movable pulley 131b may oppose the stationary pulley 131a. The movable pulley 131b may be so mounted as to be slidable in an axial direction of the secondary shaft 130 and nonrotatable relative to the axial direction of the secondary shaft 130. The pulley groove width in the secondary pulley 131 may be variable.

A chain 140 may be stretched upon the primary pulley 121 and the secondary pulley 131 to transmit driving force therebetween. The pulley groove width in the primary pulley 121 and the pulley groove width in the secondary pulley 131 may each be varied to vary a ratio, i.e., a pulley ratio, of a winding diameter of the chain 140 relative to each of the primary pulley 121 and the secondary pulley 131. Thus, the transmission ratio may be varied continuously. A transmission ratio "i" may be expressed by "i"=Rs/Rp, in which Rp denotes the winding diameter of the chain 140 relative to the primary pulley 121 and Rs denotes the winding diameter of the chain 140 relative to the secondary pulley 131. A transmission speed may be expressed by di/dt.

The primary pulley 121, e.g., the movable pulley 121b, may include a primary drive oil chamber 122. In other words, the primary drive oil chamber 122 may be a hydraulic cylinder chamber. Meanwhile, the secondary pulley 131, the movable pulley 131b, may include a secondary drive oil chamber 132. In other words, the secondary drive oil chamber 132 may be a hydraulic cylinder chamber. The pulley groove width in the primary pulley 121 may be set or changed by regulating a primary oil pressure of oil introduced into the primary drive oil chamber 122. The pulley groove width in the secondary pulley 131 may be set or changed by regulating a secondary oil pressure of oil introduced into the secondary drive oil chamber 132.

The oil pressures directed to shifting the continuously variable transmission 110, i.e., the primary oil pressure and the secondary oil pressure described above, may be controlled by a control valve, i.e., a valve body. The control valve may, for example, open or close an oil passage formed thereinside with the use of a plurality of spool valves and a solenoid valve, i.e., an electromagnetic valve, that moves the spool valves. Thus, the control valve may regulate the oil pressure of oil discharged from the oil pump 10 and feed the oil to the primary drive oil chamber 122 and the secondary drive oil chamber 132 of the continuously variable transmission 110 described above. The aforementioned oil pressure of the oil discharged from the oil pump 10 may also be referred to as a line pressure, hereinafter. FIG. 1 illustrates only some circuits, e.g., a line pressure regulating circuit and a discharge state switching circuit, of the control valve.

The oil pump 10 may be actuated with an engine output. The oil pump 10 may suck in oil stored in an oil pan through a first intake oil passage 80A and an intake port 106, raise the pressure of the oil, and discharge the oil through two discharge ports, i.e., a first discharge port 107A and a second discharge port 107B. The oil stored in the oil pan may be automatic transmission fluid (ATF). A two-port vane pump having two discharge ports may be used for the oil pump 10, for example. Alternatively, the oil pump 10 may include two intake ports corresponding to the respective discharge ports, i.e., the first discharge port 107A and the second discharge port 107B. A first line pressure oil passage 70A may be coupled to the first discharge port 107A. Oil discharged through the first discharge port 107A may be pressure-fed into the first line pressure oil passage 70A. In one implementation, the first line pressure oil passage 70A may serve as a "high-pressure oil passage" Meanwhile, a second line pressure oil passage 70B may be coupled to the second discharge port 107B. Oil discharged through the second discharge port 107B may be pressure-fed into the second line pressure oil passage 70B. The second line pressure oil passage 70B may communicate with the first line pressure oil passage 70A via a switching control valve 60, which will be described later in detail.

The first line pressure oil passage 70A may be provided with a line pressure control valve 30. The line pressure control valve 30 may regulate the oil pressure, i.e., the discharge pressure, of oil discharged from the oil pump 10 to an oil pressure, i.e., the line pressure, required by the continuously variable transmission 110.

The line pressure control valve 30 may be coupled to a first control pressure oil passage 91, the first line pressure oil passage 70A, and a drain oil passage 93. The first control pressure oil passage 91 may communicate with a line pressure linear solenoid 20 which will be described later. The drain oil passage 93 may be directed to discharging of oil. The line pressure control valve 30 may house a spool 31 thereinside. The spool 31 may be slidable in an axial direction. A spring 32 may be disposed at an end of the spool 31. The spool 31 may be actuated in the axial direction in accordance with balance between pressing force (line pressure controlling pressure×pressure receiving area) of a line pressure controlling pressure produced by the line pressure linear solenoid 20 and spring force, i.e., urging force, of the spring 32. Thus, the amount of oil discharged from the first line pressure oil passage 70A into the drain oil passage 93 may be regulated, and the line pressure may be regulated.

For example, the line pressure control valve 30 may allow communication between the first line pressure oil passage 70A and the drain oil passage 93 in a case where the spring force, i.e., the urging force, is greater than the pressing force of the line pressure controlling pressure. Thus, the oil in the first line pressure oil passage 70A may be discharged through the drain oil passage 93 to regulate the line pressure. In contrast, the line pressure control valve 30 may block communication between the first line pressure oil passage 70A and the drain oil passage 93 in a case where the spring force, i.e., the urging force, of the spring 32 is smaller than the pressing force of the line pressure controlling pressure. Thus, the oil may stop being discharged from the first line pressure oil passage 70A.

The line pressure linear solenoid 20 may include a linear solenoid. The linear solenoid may displace a valve in an axial direction in accordance with a current value of a current applied from a transmission control unit (TCU, hereinafter) 150. The current may be applied in accordance with the line pressure required by the continuously variable transmission 110. The line pressure linear solenoid 20 may regulate the line pressure controlling pressure by regulating a balance between the drain and a feeding pressure from the first line pressure oil passage 70A in accordance with the current applied to the linear solenoid. The regulated line pressure controlling pressure may be fed to the line pressure control valve 30 through the first control pressure oil passage 91. Thus, actuation of the line pressure control valve 30 may be controlled, as described above. In this example, as the current value of the current applied to the line pressure linear solenoid 20 increases, the line pressure controlling pressure may increase linearly, and along with this, an actual line pressure may also increase linearly.

As described above, the second discharge port 107B of the oil pump 10 may communicate with the first line pressure oil passage 70A via the second line pressure oil passage 70B and the switching control valve 60. Further, the second discharge port 107B of the oil pump 10 may directly or indirectly communicate with the first intake oil passage 80A via the second line pressure oil passage 70B, the switching control valve 60, and a second intake oil passage 80B.

The switching control valve 60 may switch a discharge destination of oil discharged through the second discharge port 107B between the first line pressure oil passage 70A, i.e., the high-pressure oil passage, and the second intake oil passage 80B, i.e., a low-pressure oil passage, that directly or indirectly communicates with the first intake oil passage 80A, i.e., the intake port 106. This switch may be made on the basis of spring force, i.e., urging force, of a spring 62 and pressing force of a switching oil pressure produced by a switching pressure solenoid 50 which will be described later.

Describing in greater detail, the switching control valve 60 may be coupled to a second control pressure oil passage 92, the first line pressure oil passage 70A, the second line pressure oil passage 70B, and the second intake oil passage 80B. In other words, the second control pressure oil passage 92 may be a switching pressure oil passage. The second control pressure oil passage 92 may communicate with the switching pressure solenoid 50. The second line pressure oil passage 70B may communicate with the second discharge port 107B. The second intake oil passage 80B may directly or indirectly communicate with the first intake oil passage 80A, i.e., the intake port 106. The switching control valve 60 may house a spool 61 thereinside. The spool 61 may be slidable in an axial direction. The spring 62 may be disposed at one end of the spool 61. The spool 61 may be actuated in the axial direction in accordance with a balance between the spring force, i.e., the urging force, $F_{spring}$ ($=K \times X$(spring crush margin)) of the spring 62 and pressing force $F_{SW}$ (switching oil pressure $P_{SW} \times$ pressure receiving area $A_{SW}$) of a switching oil pressure $P_{SW}$ produced by the switching pressure solenoid 50. Thus, the oil passage that is to communicate with the second line pressure oil passage 70B may be switched between the first line pressure oil passage 70A and the second intake oil passage 80B.

For example, in a case where the spring force is greater than the pressing force of the switching oil pressure, the switching control valve 60 may make a switch to allow communication between the second line pressure oil passage 70B and the first line pressure oil passage 70A. In other words, the switching control valve 60 may make the switch to allow the discharge destination of the oil discharged through the second line pressure oil passage 70B to be the first line pressure oil passage 70A. In contrast, in a case where the spring force is smaller than the pressing force of the switching oil pressure, the switching control valve 60 may make a switch to allow communication between the second line pressure oil passage 70B and the second intake oil passage 80B. In other words, the switching control valve 60 may make the switch to allow the discharge destination of the oil discharged through the second discharge port 107B to be the second intake oil passage 80B.

Therefore, in a case where the switching oil pressure is fed from the switching pressure solenoid 50, which will be described later, the switching control valve 60 may make a switch to allow communication between the second line pressure oil passage 70B and the second intake oil passage 80B. In other words, the switching control valve 60 may switch the discharge destination of the oil discharged through the second discharge port 107B to the second intake oil passage 80B, i.e., to achieve the half-discharge state. Meanwhile, in a case where the switching oil pressure is not fed from the switching pressure solenoid 50, i.e., in a case where the switching oil pressure is zero, for example, the switching control valve 60 may make a switch to allow communication between the second line pressure oil passage 70B and the first line pressure oil passage 70A. In other words, the switching control valve 60 may switch the discharge destination of the oil discharged through the second discharge port 107B to the first line pressure oil passage 70A, i.e., to achieve the full-discharge state.

The switching pressure solenoid 50 may generate the switching oil pressure directed to switching of the discharge destination of the oil discharged through the second discharge port 107B between the first line pressure oil passage 70A and the second intake oil passage 80B in accordance with, for example but not limited to, the driving state of the continuously variable transmission 110. In other words, the switching pressure solenoid 50 may generate the switching oil pressure directed to switching of the discharge state between the full-discharge state and the half-discharge state. The first line pressure oil passage 70A and the second control pressure oil passage, i.e., the switching pressure oil passage, 92 described above may be coupled to the switching pressure solenoid 50. As the switching pressure solenoid 50 is opened, a feeding pressure from the first line pressure oil passage 70A may be fed, as the switching oil pressure, to one end of the switching control valve 60, i.e., the end opposing the spring 62, through the second control pressure oil passage 92. In contrast, as the switching pressure solenoid 50 is closed, the feeding of the switching oil pressure described above may be stopped. At this point, the oil in the second control pressure oil passage 92 may be drained, and the switching oil pressure may be brought to zero.

An on-off solenoid that opens upon a voltage being applied thereto and closes upon the application of the voltage being stopped may be used as the switching pressure solenoid 50, for example. Alternatively, an normally-open solenoid that closes upon a voltage being applied thereto and opens upon the application of the voltage being stopped may be used as the switching pressure solenoid 50, for example. The opening/closing of the switching pressure solenoid 50 may be controlled by the TUT 150.

A line pressure sensor 153 may be attached to the first line pressure oil passage 70A, and the line pressure sensor 153 may detect the line pressure, i.e., the oil pressure. The line pressure sensor 153 may be electrically coupled to the TCU 150. An output of the line pressure sensor 153, i.e., an electric signal corresponding to the line pressure such as a voltage, may be retrieved by the TCU 150.

Aside from the line pressure sensor 153, various sensors including a range switch 151 and an oil temperature sensor 152 may be coupled to the TCU 150, for example. The range switch 151 may detect a selected position of a shift lever. The oil temperature sensor 152 may detect the temperature of the oil, i.e., an oil temperature, in the continuously variable transmission 110. The TCU 150 may receive information on, for example but not limited to, an accelerator pedal position and engine rotation number from an electronic control unit (ECU) 170 via a controller area network (CAN, registered trademark) 190. The ECU 170 may comprehensively control the engine 160.

The TCU 150 may include a microprocessor, an electrically erasable programmable read-only memory (EE-PROM), a random-access memory (RAM), a backup RAM, and an input and output interface (I/F). The microprocessor may perform an arithmetic operation. The EEPROM may hold, for example but not limited to, a program that causes the microprocessor to execute each process. The RAM may hold various pieces of data, such as an arithmetic operation result. The backup RAM may have its stored content kept by a battery.

The TCU 150 may continuously shift the transmission ratio automatically in accordance with the driving state of the vehicle, e.g., the accelerator pedal position and the vehicle speed, and in accordance with a gear shifting map on the basis of various pieces of information acquired, for example, from the various sensors described above. The gear shifting map may be stored in, for example but not limited to, the EEPROM in the TCU 150. The TCU 150 may control actuation of components such as the line pressure linear solenoid 20 and the switching pressure solenoid 50 described above. In other words, the TCU 150 may switch the discharge state of the oil pump 10 between the full-discharge state and the half-discharge state.

For example, the TCU 150 may perform fixation diagnosis that detects fixation of the oil pump 10 in the full-discharge state and the half-discharge state without causing a sense of discomfort in an occupant such as the driver, for example. In other words, the TCU 150 may perform fixation diagnosis that detects fixation of the switching pressure solenoid 50 and/or the switching control valve 60 both directed to switching of the discharge state. To this end, the TCU 150 may include a discharge state switching unit 150a, a target oil pressure setting unit 150b, a pressure regulator 150c, and a fixation determining unit 150d. In the TCU 150, as a program stored in, for example but not limited to, the EEPROM is executed by the microprocessor, operations of the discharge state switching unit 150a, the target oil pressure setting unit 150b, the pressure regulator 150c, and the fixation determining unit 150d may be achieved.

The discharge state switching unit 150a may actuate the switching pressure solenoid 50 to switch the discharge state of the oil pump 10 between the full-discharge state and the half-discharge state. In the full-discharge state, the two discharge ports, i.e., the first discharge port 107A and the second discharge port 107B, may communicate with the first line pressure oil passage 70A, i.e., the high-pressure oil passage. In the half-discharge state, of the two discharge ports, i.e., the first discharge port 107A and the second discharge port 107B, the first discharge port 107A may communicate with the first line pressure oil passage 70A, and the second discharge port 107B may directly or indirectly communicate with the intake port 106 of the oil pump 10, i.e., the first intake oil passage 80A. In other words, in one implementation, the discharge state switching unit 150a, the switching pressure solenoid 50, and the switching control valve 60 may serve as a "discharge state switching unit".

The target oil pressure (target line pressure) setting unit 150b may set a diagnostic target oil pressure directed to determining whether the oil pump 10 is fixed in one of the full-discharge state and the half-discharge state. When making a fixation determination, i.e., fixation diagnosis, as to whether the oil pump 10 is fixed in one of the full-discharge state and the half-discharge state, the target oil pressure setting unit 150b may set, as the diagnostic target oil pressure, a value that is higher than a maximum pressure in the half-discharge state. This value may be the sum of a half-discharge maximum pressure and a predetermined value. In one example, the predetermined value may be a value that does not lead to an erroneous determination in consideration of various fluctuations.

For example, the diagnostic target oil pressure may be set to a value that is higher than the maximum pressure in the half-discharge state and lower than a maximum pressure in the full-discharge state. In this example, maps, e.g., a half-discharge maximum pressure map and a full-discharge maximum pressure map, each defining a relationship among the engine rotation number, the oil temperature, and the corresponding maximum pressure may be stored in advance, for example, and the maximum pressure in the half-discharge state and the maximum pressure in the full-discharge state may be obtained by searching the respective maps with the engine rotation number and the oil temperature. As the engine rotation number increases, the maximum pressures may also increase. In contrast, as the oil temperature increases, the maximum pressures may decrease. When the fixation determination, i.e., fixation diagnosis, is not being made, i.e., during regular driving, the target oil pressure setting unit 150b may set the target oil pressure, i.e., the target line pressure, in accordance with the driving state, e.g., the vehicle speed or the accelerator position, of the vehicle. A map, i.e., a diagnostic target oil pressure map, defining a relationship among the engine rotation number, the oil temperature, and the diagnostic target oil pressure may be stored in advance, and the diagnostic target oil pressure may be obtained directly by searching the map with the engine rotation number and the oil temperature. The diagnostic target oil pressure set as described above may be output to the pressure regulator 150c.

The pressure regulator 150c may actuate the line pressure linear solenoid 20 to perform control of making an actual oil pressure, i.e., an actual line pressure, coincide with the diagnostic target oil pressure.

Figure 3:
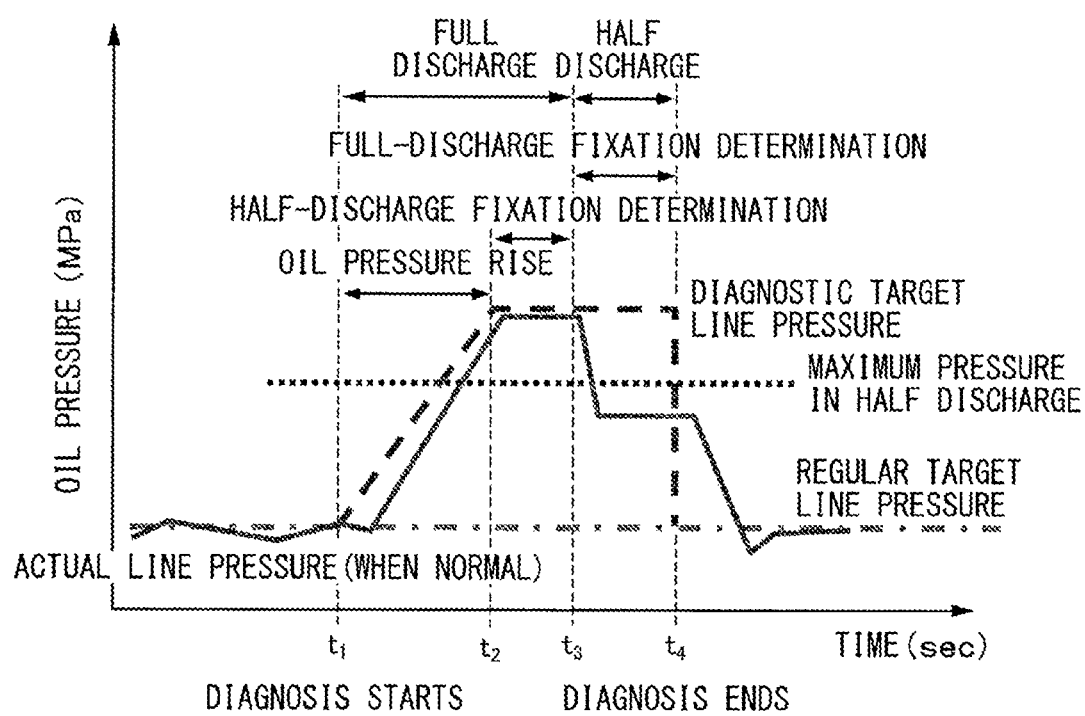
FIG. 3 is a diagram for describing an example of a fixation detecting method performed by the oil pump fixation detecting apparatus according to one implementation.

The fixation determining unit 150d may determine whether the oil pump 10 is fixed in one of the full-discharge state and the half-discharge state. Referring also to FIG. 3, a method of detecting fixation in one of the full-discharge state and the half-discharge state will be described in detail. FIG. 3 is a diagram for describing an example of a fixation detecting method performed by the oil pump fixation detecting apparatus 1. FIG. 3 illustrates an example of variation in the diagnostic target oil pressure, i.e., the diagnostic target line pressure, the maximum pressure in the half-discharge state, and the actual oil pressure, i.e., the actual line pressure, FIG. 3 also illustrates a regular target oil pressure, i.e., a regular target line pressure. In FIG. 3, the horizontal axis represents the time (sec), and the vertical axis represents the oil pressure (MPa). In FIG. 3, the actual line pressure, i.e., the actual oil pressure, is indicated by a solid line, the diagnostic target line pressure is indicated by a dashed line, the maximum pressure in the half-discharge state is indicated by a dotted line, and the regular target line pressure is indicated by a dashed-dotted line.

When executing diagnosis of fixation of the oil pump 10 in one of the full-discharge state and the half-discharge state, the discharge state switching unit 150a may first actuate the switching pressure solenoid 50 to control the discharge state of the oil pump 10 to be the full-discharge state (see t1 in FIG. 3).

The target oil pressure setting unit 150b may set, as the diagnostic target oil pressure, a value higher than the maximum pressure in the half-discharge state. At this point, the target oil pressure setting unit 150b may gradually raise the diagnostic target oil pressure to the value exceeding the maximum pressure in the half-discharge state with a prescribed slope to allow the actual oil pressure to follow the diagnostic target oil pressure (see t1 to t2 in FIG. 3). In this example, this prescribed slope may be set in accordance with the oil temperature and the engine rotation number, for example. The prescribed slope may be set in consideration of the followability of the actual oil pressure. After raising the diagnostic target oil pressure to the value exceeding the maximum pressure in the half-discharge state, the target oil pressure setting unit 150b may keep, i.e., fix, the diagnostic target oil pressure at that value (see t2 to t4 in FIG. 3). The maximum pressure in the half-discharge state may be obtained on the basis of the engine rotation number and the oil temperature, as described above.

The pressure regulator 150c may actuate the line pressure linear solenoid 20 to perform control of making the actual oil pressure coincide with the diagnostic target oil pressure.

When a predetermined time has passed after the diagnostic target oil pressure has been raised to the value exceeding the maximum pressure in the half-discharge state, the fixation determining unit 150d may start determining, i.e., diagnosing, whether the oil pump 10 is fixed in the half-discharge state. For example, the fixation determining unit 150d may determine that the oil pump 10 is not fixed in the half-discharge state in a case where the actual oil pressure has risen beyond the maximum pressure in the half-discharge state, e.g., in a case where the actual oil pressure substantially coincides with the diagnostic target oil pressure (see t2 to t3 in FIG. 3). In contrast, the fixation determining unit 150d may determine that the oil pump 10 is fixed in the half-discharge state in a case where the actual oil pressure does not rise beyond the maximum pressure in the half-discharge state. The determination, i.e., diagnosis, on fixation in the half-discharge state may be omitted.

After the diagnosis of fixation in the half-discharge state is finished, i.e., in a case where it is determined that the oil pump 10 is not fixed in the half-discharge state, the discharge state switching unit 150a may actuate the switching pressure solenoid 50 to perform control of switching the discharge state of the oil pump 10 from the full-discharge state to the half-discharge state (see t3 in FIG. 3).

After this control of switching the discharge state of the oil pump 10 from the full-discharge state to the half-discharge state is performed, the fixation determining unit 150d may determine whether the oil pump 10 is fixed in the full-discharge state on the basis of whether the actual oil pressure has dropped by a predetermined pressure or more and whether the actual oil pressure has dropped to or below a predetermined pressure, i.e., the maximum pressure in the half-discharge state. In other words, after the control of switching the discharge state of the oil pump 10 from the full-discharge state to the half-discharge state is performed, the fixation determining unit 150d may determine that the oil pump 10 is not fixed in the full-discharge state in a case where the actual oil pressure has dropped by a predetermined value or more within a predetermined time and the actual oil pressure is at or below the maximum pressure in the half-discharge state for a prescribed time. In contrast, the fixation determining unit 150d may determine that the oil pump 10 is fixed in the full-discharge state in a case where the actual oil pressure does not drop by the predetermined value or more within the predetermined time or where the actual oil pressure does not drop to the maximum pressure in the half-discharge state (see t3 to t4 in FIG. 3). At this point, the predetermined time may be set in accordance with the oil temperature and the engine rotation number, for example. The predetermined time may be set in consideration of the followability of the oil pressure held when a switch is made to the half-discharge state during a normal state. The predetermined value may be set, for example, on the basis of the engine rotation number and the oil temperature in consideration of a difference between the diagnostic target oil pressure and the maximum pressure in the half-discharge state or in accordance with a difference between the diagnostic target oil pressure and the maximum pressure in the half-discharge state. In one example, the prescribed time may be set short within a range that does not cause a decrease in the reliability of the fixation determination. After the fixation determination, i.e., the fixation diagnosis, is finished, the oil pressure may be restored to the regular target oil pressure, i.e., the target line pressure, from the diagnostic target oil pressure (see t4 and thereafter in FIG. 3).

Figure 4A:
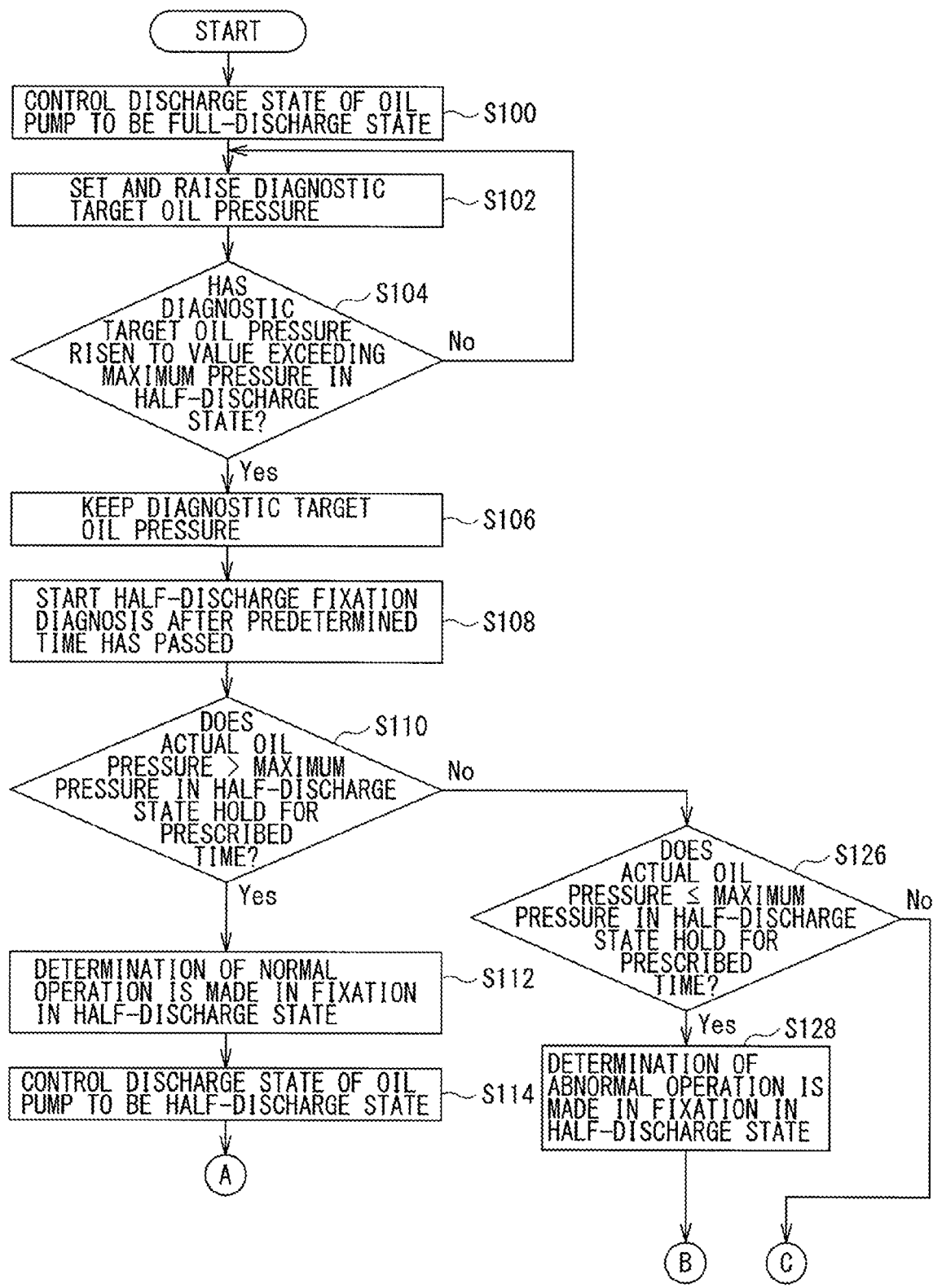
FIGS. 4A and 4B are flowcharts illustrating an example of a procedure in a fixation detecting process performed by the oil pump fixation detecting apparatus according to one implementation.
Figure 4B:
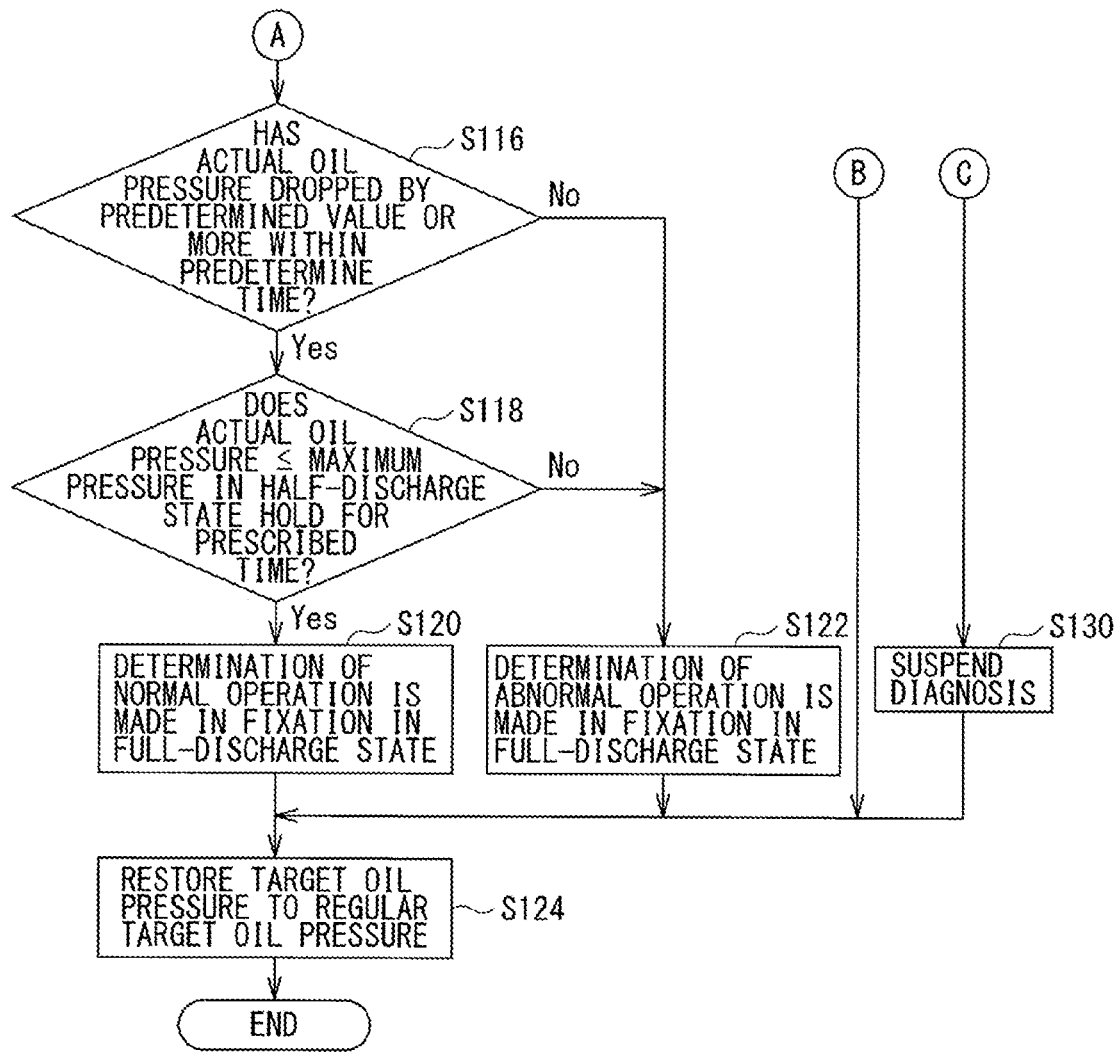

Next, referring to FIGS. 4A and 4B, an operation of the oil pump fixation detecting apparatus 1, i.e., the fixation detecting method, will be described. FIGS. 4A and 4B are flowcharts illustrating an example of a procedure in a fixation detecting process performed by the oil pump fixation detecting apparatus 1. This process may be executed mainly in the TCU 150 repeatedly at a predetermined time interval, e.g., every 10 ms.

In step S100, the switching pressure solenoid 50 may be actuated to control the discharge state of the oil pump 10 to be the full-discharge state (see t1 in FIG. 3). In one implementation, step S100 may serve as "full-discharge switching".

Thereafter, in step S102, as the diagnostic target oil pressure, a value higher than the maximum pressure in the half-discharge state, i.e., the sum of the maximum pressure in the half-discharge state and the predetermined value, may be set. In one implementation, step S102 may serve as "target oil pressure setting" and "oil pressure regulation". At this point, the diagnostic target oil pressure may be raised gradually to the value exceeding the maximum pressure in the half-discharge state with a prescribed slope to allow the actual oil pressure to follow the diagnostic target oil pressure. The actual oil pressure may be so regulated as to coincide with the diagnostic target oil pressure (see t1 to t2 in FIG. 3).

In step S104, it may be determined whether the diagnostic target oil pressure has risen to, or reached, the value exceeding the maximum pressure in the half-discharge state, i.e., the sum of the maximum pressure in the half-discharge state and a predetermined value. In a case where the diagnostic target oil pressure does not rise to the value exceeding the maximum pressure in the half-discharge state (No in step S104), the process may return to step S102, and the processes in step S102 and step S104 described above may be executed repeatedly until the diagnostic target oil pressure rises to the value exceeding the maximum pressure in the half-discharge state. In contrast, when the diagnostic target oil pressure has risen to the value exceeding the maximum pressure in the half-discharge state (Yes in step S104), the process may proceed to step S106.

In a case where the diagnostic target oil pressure has been raised to the value exceeding the maximum pressure in the half-discharge state (Yes in step S104), in step S106, the diagnostic target oil pressure may be kept, or fixed, at this value (see t2 to t4 in FIG. 3). When a predetermined time has passed after the diagnostic target oil pressure has been raised to the value exceeding the maximum pressure in the half-discharge state, in step S108, a determination, i.e., diagnosis, as to whether the oil pump 10 is fixed in the half-discharge state may be started.

Thereafter, in step S110, after the diagnosis is started, it may be determined whether the actual oil pressure has exceeded the maximum pressure in the half-discharge state for a prescribed time. In a case where the actual oil pressure has exceeded the maximum pressure in the half-discharge state for the prescribed time (Yes in step S110), the process may proceed to step S112. Meanwhile, when the actual oil pressure does not exceed the maximum pressure in the half-discharge state for the prescribed time (No in step S110), the process may proceed to step S126.

In a case where the actual oil pressure has exceeded the maximum pressure in the half-discharge state (Yes in step S110), e.g., in a case where the actual oil pressure has substantially coincided with the diagnostic target oil pressure, in step S112, it may be determined that the oil pump 10 is not fixed in the half-discharge state, i.e., a determination of normal operation may be made (see t2 to t3 in FIG. 3).

After the half-discharge fixation diagnosis is finished, i.e., in a case where it is determined that the oil pump 10 is not fixed in the half-discharge state, in step S114, the switching pressure solenoid 50 may be actuated to perform control of switching the discharge state of the oil pump 10 to the half-discharge state (see t3 in FIG. 3). In one implementation, step S114 may serve as "partial-discharge switching".

Thereafter, in step S116, it may be determined whether the actual oil pressure has dropped by a predetermined value or more within a predetermined time after the control of switching the discharge state of the oil pump 10 from the full-discharge state to the half-discharge state has been performed. In other words, it may be determined whether there has been a pressure drop by a predetermined pressure or more. In one implementation, step S116 may serve as "full-discharge fixation determination". In a case where the actual oil pressure has dropped by the predetermined value or more within the predetermined time (Yes in step S116), the process may proceed to step S118. In contrast, when the actual oil pressure does not drop by the predetermined value or more within the predetermined time (No in step S116), in step S122, it may be determined that the oil pump 10 is fixed in the full-discharge state, i.e., a determination of abnormal operation may be made. Thereafter, the process may proceed to step S124.

In step S118, it may be determined whether the actual oil pressure has dropped to or below a predetermined pressure, i.e., the maximum pressure in the half-discharge state, for a prescribed time. In one implementation, step S118 may serve as "full-discharge fixation determination". In a case where the actual oil pressure has dropped to or below the predetermined pressure, i.e., the maximum pressure in the half-discharge state (Yes in step S118), in step S120, it may be determined that the oil pump 10 is not fixed in the full-discharge state, i.e., a determination of normal operation may be made. Thereafter, the process may proceed to step S124. In contrast, when the actual oil pressure does not drop to the predetermined pressure, i.e., the maximum pressure in the half-discharge state, for the prescribed time (No in step S118), in step S122, it may be determined that the oil pump 10 is fixed in the full-discharge state i.e., a determination of abnormal operation may be made. Thereafter, the process may proceed to step S124 (see t3 to t4 in FIG. 3).

In step S124, the fixation diagnosis may be terminated, and the target oil pressure may be restored to the regular target oil pressure, i.e., the target line pressure, from the diagnostic target oil pressure (see t4 and thereafter in FIG. 3).

In contrast, in a case where the determination result in step S110 described above is negative, in step S126, it may be determined whether the actual oil pressure is at or below the maximum pressure in the half-discharge state for another prescribed time. In a case where the actual oil pressure is at or below the maximum pressure in the half-discharge state for the prescribed time (Yes in step S126), in step S128, it may be determined that the oil pump 10 is fixed in the half-discharge state, i.e., a determination of abnormal operation may be made. Thereafter, the process may proceed to step S124. In contrast, when the actual oil pressure is not at or not below than the maximum pressure in the half-discharge state for the prescribed time (No in step S126), it may be speculated that the oil pressure is hunting, and the fixation diagnosis, i.e., a fixation determination, may be suspended in step S130. Thereafter, the process may proceed to step S124.

As described above, in step S124, the fixation diagnosis may be terminated, and the target oil pressure may be restored to the regular target oil pressure, i.e., the target line pressure, from the diagnostic target oil pressure.

As described in detail thus far, according to the foregoing example implementation, when the fixation determination of determining whether the oil pump 10 is fixed in one of the full-discharge state and the half-discharge state is carried out, the control of bringing the discharge state of the oil pump 10 to the full-discharge state may be performed. As the diagnostic target oil pressure directed to determining whether the oil pump 10 is fixed in one of the full-discharge state and the half-discharge state, a value higher than the maximum pressure in the half-discharge state may be set. The oil pressure in the first line pressure oil passage 70A, i.e., the high-pressure oil passage, may be so regulated as to coincide with the diagnostic target oil pressure. In other words, controlling the discharge state to be the full-discharge state when the actual oil pressure is so raised as to coincide with the diagnostic target oil pressure allows the time in a half-discharge and high-pressure state to be reduced during normal operation, i.e., when the oil pump 10 is not fixed in the half-discharge state.

It may be determined that the oil pump 10 is not fixed in the half-discharge state in a case where the regulated oil pressure has risen beyond the maximum pressure in the half-discharge state, and it may be determined that the oil pump 10 is fixed in the half-discharge state in a case where the oil pressure does not rise beyond the maximum pressure in the half-discharge state. In other words, during normal operation, i.e., when the oil pump 10 is not fixed in the half-discharge state, making a determination as to whether the oil pump 10 is fixed in the half-discharge state while the full-discharge state is retained allows the time in the half-discharge and high-pressure state to be reduced.

Further, thereafter, the control of switching the discharge state of the oil pump 10 from the full-discharge state to the half-discharge state may be performed (step S114). It may be determined that the oil pump 10 is not fixed in the full-discharge state in a case where the oil pressure has dropped by the predetermined value or more within the predetermined time and the oil pressure has dropped to or below the maximum pressure in the half-discharge state. Further, it may be determined that the oil pump 10 is fixed in the full-discharge state in a case where the oil pressure does not drop by the predetermined value or more within the predetermined time or the oil pressure does not drop to or below the maximum pressure in the half-discharge state. In other words, the determination as to fixation in the full-discharge state may be made on the basis of the amount by which the oil pressure has dropped and the value of the oil pressure. This, therefore, allows whether the oil pump 10 is fixed in the full-discharge state to be determined more reliably in a relatively short period of time, i.e., while reducing the time in which a high pressure is retained in the half-discharge state, after the control of switching the discharge state of the oil pump 10 from the full-discharge state to the half-discharge state is performed. At this point, the aforementioned predetermined value may be set in accordance with the engine rotation number and the oil temperature. The discharge pressure of the oil pump may vary with the number of rotations of the engine actuating the oil pump and the oil temperature. Therefore, it is allowed becomes possible to determine whether the oil pump is fixed in the full-discharge state with higher accuracy.

As described above, it is allowed to reduce the time in the half-discharge state and in the high-pressure state. In other words, it is allowed to reduce the time in which a strange sound might occur in the half-discharge and high-pressure state. As a result, it becomes possible to detect fixation of the oil pump 10 in the full-discharge state and the half-discharge state without causing a sense of discomfort in the occupant such as the driver, for example, during the fixation diagnosis. In this case, it is possible to diagnose both fixation in the full-discharge state and fixation in the half-discharge state in a single instance of diagnosis.

According to the foregoing example implementation, the diagnostic target oil pressure may be set in accordance with the engine rotation number and the oil temperature. The discharge pressure of the oil pump may vary with the engine rotation number and the oil temperature. Therefore, the fixation determination is allowed to be made with higher accuracy.

According to the foregoing example implementation, when the fixation determination is made, the diagnostic target oil pressure may be raised gradually to the value exceeding the maximum pressure in the half-discharge state with a prescribed slope to allow the actual oil pressure to follow the diagnostic target oil pressure. This allows for suppression of an erroneous determination by raising the diagnostic target oil pressure in consideration of the followability, i.e., a delay, of the actual oil pressure.

Moreover, according to the foregoing example implementation, after the diagnostic target oil pressure has been raised to the value exceeding the maximum pressure in the half-discharge state, this diagnostic target oil pressure may be kept, or fixed. When the predetermined time has passed after the diagnostic target oil pressure has been raised to the value exceeding the maximum pressure in the half-discharge state, the determination as to whether the oil pump 10 is fixed in the half-discharge state may be started. This allows for suppression of an erroneous determination by starting the determination in consideration of the followability, i.e., a delay, of the actual oil pressure.

Some example implementations of the technology have been described thus far. The technology, however, is not limited to the example implementations described above, and various modifications are possible. For example, an example case in which one implementation of the technology is applied to the continuously variable transmission (CVT) 110 has been described in the foregoing example implementation. Alternatively, it is possible to apply one implementation of the technology to, for example but not limited to, a stepped automatic transmission (Step AT) and a dual-clutch transmission (DCT). One implementation of the technology is applied to the continuously variable transmission (CVT) 110 of a chain type in the foregoing example implementation. Alternatively, it is possible to apply one implementation of the technology to, for example but not limited to, a continuously variable transmission of a belt type and a continuously variable transmission of a toroidal type, instead of the continuously variable transmission of a chain type.

The oil pump 10 of a two-port type having the two discharge ports, i.e., the first discharge port 107A and the second discharge port 107B, has been described as an example in the foregoing example implementation. Alternatively, an oil pump having three or more discharge ports may be used, instead of the oil pump 10 of a two-port type. A vane pump is used as the oil pump 10 in the foregoing example implementation. Alternatively, it is possible to use, for example but not limited to, an internal-gear type gear pump or a trochoid pump, instead of a vane pump.

The partial-discharge state is not limited to the half-discharge state and may be any driving state with a discharge amount, i.e., a capacity, smaller than that in the full-discharge state.

An on-off solenoid is used as the switching pressure solenoid 50 in the foregoing example implementation. Alternatively, a duty solenoid, a linear solenoid, or any other solenoid, for example, may be used instead of an on-off solenoid.

To make a determination as to fixation in the full-discharge state, two techniques are used in combination in the foregoing implementation. For example, the technique in which the value of the oil pressure is used and the technique in which the amount of drop in the oil pressure, i.e., a drop range, is used are used in combination. Alternatively, either one of the two techniques alone may be used.

Each of the TCU 150, the discharge state switching unit 150a, the target oil pressure setting unit 150b, the pressure regulator 150c, and the fixation determining unit 150d illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the TCU 150, the discharge state switching unit 150a, the target oil pressure setting unit 150b, the pressure regulator 150c, and the fixation determining unit 150d. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the TCU 150, the discharge state switching unit 150a, the target oil pressure setting unit 150b, the pressure regulator 150c, and the fixation determining unit 150d illustrated in FIG. 1.

Although some implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. An oil pump fixation detecting apparatus for determining an operational discharge state of an oil pump by operational fixation determination of the oil pump, the oil pump fixation detection apparatus comprising:
   the oil pump configured to raise a pressure of oil sucked in through an intake port and discharge the oil through a plurality of discharge ports;
   a high-pressure oil passage; and
   a processor coupled to a memory storing instructions, the processor being configured to:
      switch the discharge state of the oil pump between a full-discharge state and a partial-discharge state, all ports of the plurality of discharge ports communicating with the high-pressure oil passage in the full-discharge state, one or more ports of the plurality of discharge ports communicating with the high-pressure oil passage and another one or more ports of the plurality of discharge ports communicating with the intake port of the oil pump in the partial-discharge state;
      set a diagnostic target oil pressure directed to determining whether the oil pump is fixed in one of the full-discharge state and the partial-discharge state;
      regulate an oil pressure in the high-pressure oil passage to allow the oil pressure in the high-pressure oil passage to coincide with the diagnostic target oil pressure; and
      carry out a fixation determination as to whether the oil pump is fixed in one of the full-discharge state and the partial-discharge state on a basis of the oil pressure regulated by the processor,
   wherein, as full-discharge switching, the processor controls the discharge state of the oil pump in the full-discharge state, when the processor carries out the fixation determination,
   as target oil pressure setting, the processor sets, as the diagnostic target oil pressure, a value higher than a maximum pressure in the partial-discharge state, when the processor carries out the fixation determination,
   as oil pressure regulation, the processor regulates the oil pressure in the high-pressure oil passage to allow the oil pressure in the high-pressure oil passage to coincide with the diagnostic target oil pressure, when the processor carries out the fixation determination,
   the processor performs control of switching the discharge state of the oil pump from the full-discharge state to the partial-discharge state, after the full-discharge switching, the target oil pressure setting, and the oil pressure regulation have been performed,
   the processor determines that the oil pump is not operationally fixed in the full-discharge state in a case where the oil pressure in the high-pressure oil passage has dropped by a predetermined value or more within a predetermined time after the control of switching the discharge state of the oil pump from the full-discharge state to the partial-discharge state has been performed, and the processor determines that the oil pump is operationally fixed in the full-discharge state in a case where the oil pressure in the high-pressure oil passage does not drop by the predetermined value or more within the predetermined time after the control of switching the discharge state of the oil pump from the full-discharge state to the partial-discharge state has been performed.

2. The oil pump fixation detecting apparatus according to claim 1, wherein, when the discharge state of the oil pump is being controlled in the full-discharge state, the processor determines that the oil pump is not fixed in the partial-discharge state in a case where the regulated oil pressure in the high-pressure oil passage has risen beyond the maximum pressure in the partial-discharge state, and determines that the oil pump is fixed in the partial-discharge state in a case where the oil pressure in the high-pressure oil passage does not rise beyond the maximum pressure in the partial-discharge state.

3. The oil pump fixation detecting apparatus according to claim 2, wherein, when the fixation determination is carried out, the processor gradually raises the diagnostic target oil pressure to a value exceeding the maximum pressure in the partial-discharge state with a prescribed slope.

4. The oil pump fixation detecting apparatus according to claim 3, wherein the processor keeps the diagnostic target oil pressure after raising the diagnostic target oil pressure to a value exceeding the maximum pressure in the partial-discharge state, and
wherein the processor starts determining whether the oil pump is fixed in the partial-discharge state when a predetermined time has passed after the diagnostic target oil pressure has been raised to the value exceeding the maximum pressure in the partial-discharge state.

5. The oil pump fixation detecting apparatus according to claim 2, wherein the processor keeps the diagnostic target oil pressure after raising the diagnostic target oil pressure to a value exceeding the maximum pressure in the partial-discharge state, and
wherein the processor starts determining whether the oil pump is fixed in the partial-discharge state when a predetermined time has passed after the diagnostic target oil pressure has been raised to the value exceeding the maximum pressure in the partial-discharge state.

6. The oil pump fixation detecting apparatus according to claim 2, wherein
the processor determines that the oil pump is fixed in the full-discharge state in a case where the oil pressure does not drop by the predetermined value or more within the predetermined time after the control of switching the discharge state of the oil pump from the full-discharge state to the partial-discharge state has been performed, and
wherein the processor determines that the oil pump is fixed in the full-discharge state in a case where the oil pressure does not drop to or below the maximum pressure in the partial-discharge state within the predetermined time after the control of switching the discharge state of the oil pump from the full-discharge state to the partial-discharge state has been performed.

7. The oil pump fixation detecting apparatus according to claim 2, wherein the processor sets the predetermined value on a basis of an oil temperature and engine rotation number of an engine that actuates the oil pump.

8. The oil pump fixation detecting apparatus according to claim 2, wherein the processor sets the diagnostic target oil pressure on a basis of an oil temperature and engine rotation number of an engine that actuates the oil pump.

9. The oil pump fixation detecting apparatus according to claim 1, wherein
the processor determines that the oil pump is fixed in the full-discharge state in a case where the oil pressure does not drop by the predetermined value or more within the predetermined time after the control of switching the discharge state of the oil pump from the full-discharge state to the partial-discharge state has been performed, and
wherein the processor determines that the oil pump is fixed in the full-discharge state in a case where the oil pressure does not drop to or below the maximum pressure in the partial-discharge state within the predetermined time after the control of switching the discharge state of the oil pump from the full-discharge state to the partial-discharge state has been performed.

10. The oil pump fixation detecting apparatus according to claim 1, wherein the processor sets the predetermined value on a basis of an oil temperature and engine rotation number of an engine that actuates the oil pump.

11. The oil pump fixation detecting apparatus according to claim 10, wherein
the processor determines that the oil pump is fixed in the partial-discharge state in a case where the oil pressure in the high-pressure oil passage does not rise beyond the maximum pressure in the partial-discharge state when the discharge state of the oil pump is being controlled in the full-discharge state.

12. The oil pump fixation detecting apparatus according to claim 1, wherein the processor sets the diagnostic target oil pressure on a basis of an oil temperature and engine rotation number of an engine that actuates the oil pump.

* * * * *